United States Patent
Houser et al.

(10) Patent No.: US 10,955,043 B2
(45) Date of Patent: Mar. 23, 2021

(54) AXLE ASSEMBLY WITH VARIABLE SPEED PUMP

(71) Applicant: Dana Heavy Vehicle Systems Group, LLC, Maumee, OH (US)

(72) Inventors: Jordan M. Houser, Toledo, OH (US); Mark W. Leber, Holland, OH (US); Marcus W. Schmidt, Swanton, OH (US)

(73) Assignee: Dana Heavy Vehicle Group, LLC, Maumee, OH (US)

( * ) Notice: Subject to any disclaimer, the term of this patent is extended or adjusted under 35 U.S.C. 154(b) by 44 days.

(21) Appl. No.: 16/543,995

(22) Filed: Aug. 19, 2019

(65) Prior Publication Data
US 2021/0054922 A1  Feb. 25, 2021

(51) Int. Cl.
| | | |
|---|---|---|
| *F16H 57/04* | (2010.01) | |
| *B60K 17/16* | (2006.01) | |
| *B60B 35/12* | (2006.01) | |
| *F16N 13/20* | (2006.01) | |
| *F16H 48/06* | (2006.01) | |
| *F16N 7/38* | (2006.01) | |

(52) U.S. Cl.
CPC ....... *F16H 57/0483* (2013.01); *B60B 35/125* (2013.01); *B60K 17/165* (2013.01); *F16H 48/06* (2013.01); *F16N 7/38* (2013.01); *F16N 13/20* (2013.01); *F16N 2210/12* (2013.01)

(58) Field of Classification Search
None
See application file for complete search history.

(56) References Cited

U.S. PATENT DOCUMENTS

| | | |
|---|---|---|
| 3,618,712 A | 11/1971 | Casey |
| 5,092,746 A | 3/1992 | Henke |
| 5,513,962 A | 5/1996 | Easton |
| 7,980,983 B2 * | 7/2011 | Schrand ............... F16H 48/34 |
| | | 475/231 |
| 8,858,381 B2 | 10/2014 | Trost |
| 9,028,358 B2 | 5/2015 | Valente |
| 9,103,433 B2 | 8/2015 | Kwasniewski |
| 9,126,576 B2 | 9/2015 | Rühle |
| 9,267,596 B2 | 2/2016 | Trost |
| 9,810,311 B1 | 11/2017 | Zhang |
| 2016/0341192 A1 | 11/2016 | Jansson |
| 2016/0369786 A1 | 12/2016 | Vehmaa |

FOREIGN PATENT DOCUMENTS

WO    2018069163    4/2018

* cited by examiner

Primary Examiner — Colby M Hansen
(74) Attorney, Agent, or Firm — Marshall & Melhorn, LLC

(57) ABSTRACT

An axle assembly having an axle housing with a center portion defining a sump and one or more axle shaft housings extending from the center portion. Each of the axle shaft housings receives an axle half shaft. The axle housing includes a differential assembly having a ring gear; and a lubrication directing assembly disposed directly adjacent to the ring gear. The axle assembly also includes a pump mounted in one or more of the axle shaft housings and is drivingly coupled to a pump gear. The pump gear is drivingly coupled to the axle half shaft. The axle assembly also includes an axle housing cover surrounding the axle housing. A fluid storage tank is attached to the housing cover, wherein the fluid storage tank includes a fill channel directly attached to the housing cover.

12 Claims, 6 Drawing Sheets

AXLE ASSEMBLY WITH VARIABLE SPEED PUMP

FIELD

The present disclosure generally relates to an axle assembly including a pump, and specifically relates to an axle assembly including a variable speed lubrication fluid pump.

BACKGROUND

Axle assemblies have internal cavities housing gear assemblies that must be properly lubricated to avoid premature wear and failure. The internal cavities must be filled with a certain level of lubrication fluid so that the gear assemblies can be lubricated as gear components rotate within the internal cavity. This is particularly the case during vehicle startup for certain components, such as differentials and power distribution units.

Lubrication fluid often collects at the ring gear and the lubricant sump in conventional axle assemblies. As a result, these axle assemblies experience churning losses and inefficiencies. It would therefore be advantageous to readily reduce the amount of lubrication fluid in some components of axle assemblies, while providing the lubrication fluid to other axle assembly components in order to maintain proper temperature and lubricant life in the vehicle.

SUMMARY

In an embodiment, an axle assembly having an axle housing with a center portion defining a sump and one or more axle shaft housings extending from the center portion. Each of the axle shaft housings receives an axle half shaft. The axle housing includes a differential assembly having a ring gear; and a lubrication directing assembly disposed directly adjacent to the ring gear. The axle assembly also includes a pump mounted in one or more of the axle shaft housings and is drivingly coupled to a pump gear. The pump gear is drivingly coupled to the axle half shaft. The axle assembly also includes an axle housing cover surrounding the axle housing. A fluid storage tank is attached to the housing cover, wherein the fluid storage tank includes a fill channel directly attached to the housing cover.

In some embodiments, the pump includes one or more tangs and the pump is mounted in one or more of the axle shaft housings using the one or more tangs.

In some embodiments, the pump is a gerotor pump and the pump gear is a helical gear.

In some embodiments, the pump includes a one-way check valve to prevent any back flow of lubrication fluid and ensure that there is lubrication fluid readily available during vehicle startup.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

Disclosed herein is an axle assembly with a variable speed pump that may be used in automotive, off-road vehicle, all-terrain vehicle, construction, and structural applications. As a non-limiting example, the axle assembly with a variable speed pump disclosed herein may also be used in passenger vehicle, electric vehicle, hybrid vehicle, commercial vehicle, autonomous vehicle, semi-autonomous vehicle and/or heavy vehicle applications. The axle assembly disclosed herein may be a single axle assembly or may be configured as part of a tandem axle assembly, a tridem axle assembly, and/or an electric axle assembly.

For description purposes, the terms "prime mover", "engine," "electric machine," and like terms, are used herein to indicate a power source. Said power source could be fueled by energy sources including hydrocarbon, electrical, solar, and/or pneumatic, to name but a few. Although typically described in a vehicle or automotive application, one skilled in the art will recognize the broader applications for this technology and the use of alternative power sources for driving a transmission including this technology.

Figure 1:
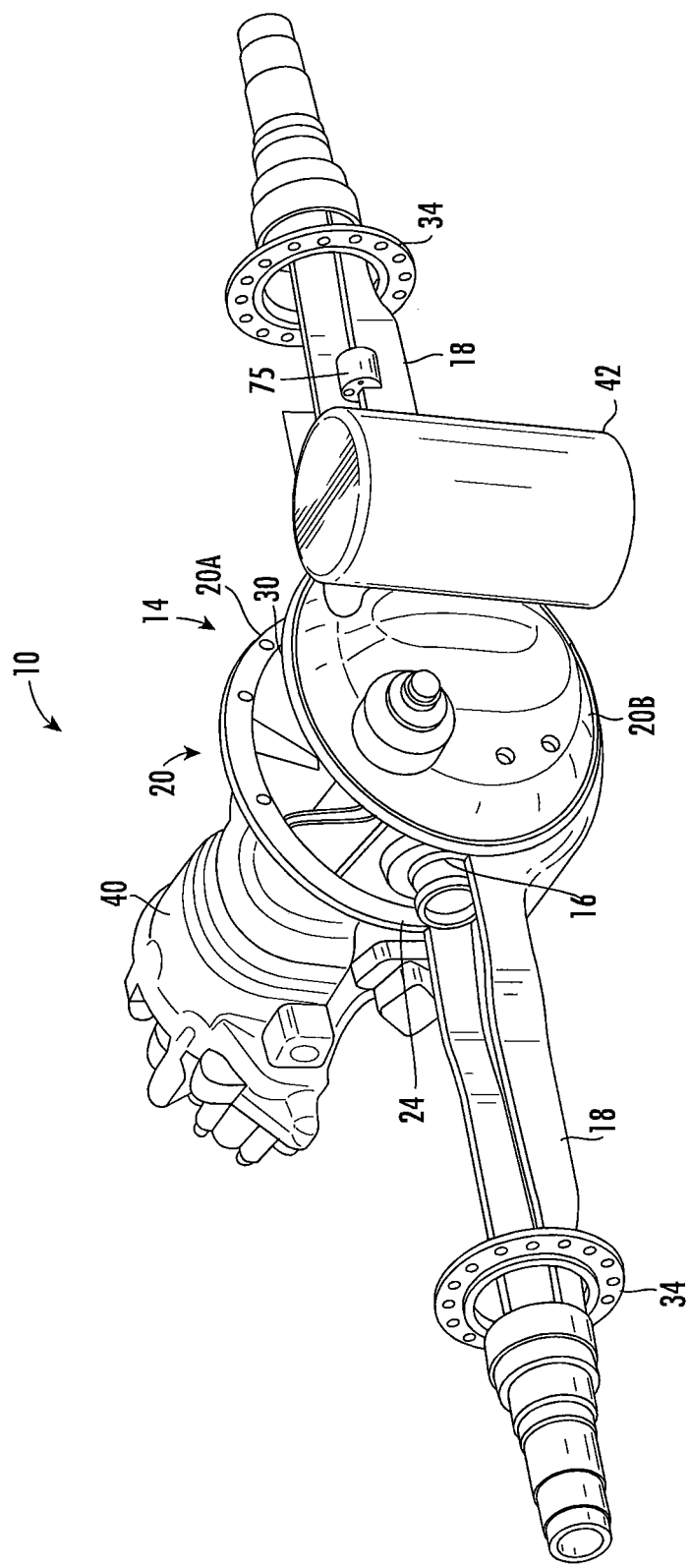
FIG. 1 illustrates a schematic perspective view of an exemplary axle assembly including a fluid storage tank and a pump.

Referring to FIG. 1, FIG. 1 shows a schematic perspective view of an axle assembly 10 including a fluid storage tank 42 and a pump 75. In some embodiments, the axle assembly 10 is a forward drive axle. In other embodiments, the axle assembly 10 is a rear drive axle.

As best shown in FIG. 1, the axle assembly 10 may include an axle housing 14, a differential assembly 16, and one or more axle shaft housings 18. The axle housing 14 may have a size and a shape to receive and/or retain various components of the axle assembly 10.

In accordance with the embodiment illustrated in FIG. 1 of the disclosure and as a non-limiting example, at least a portion of the two axle shaft housings 18 may be integrally connected to opposing ends of the axle housing 14. Each of the axle shaft housings 18 may be of a size and shape to receive at least a portion of an axle half shaft 28 therein. The axle shaft housings 18 may each have a hollow configuration or a tubular configuration that may extend around the axle half shafts 28. Each of the axle half shafts 28 may be drivingly connected to ends of the differential assembly 16.

As best shown in FIG. 1, the axle housing 14 may also be surrounded by an axle housing cover 20. The axle housing cover 20 may include a front housing cover 20A and an opposing rear housing cover 20B. The front housing cover 20A and the rear housing cover 20B may be mated together to fully surround the axle housing 14.

As best shown in FIG. 1 and as a non-limiting example, the axle housing 14 includes a center portion 24, wherein the axle shaft housings 18 extend in opposite directions from the center portion 24. The center portion 24 may be disposed proximate the center of the axle housing 14. The center portion 24 may define a cavity 30 that may receive the differential assembly 16.

As best shown in FIG. 1 and as a non-limiting example, brake flanges 34 are disposed proximate to ends of the axle shaft housings 18. The brake flanges 34 may facilitate coupling of the axle half shafts 28 to one or more wheel hubs (not shown) and one or more brakes (not shown) to the axle shaft housings 18 in order to provide braking.

Figure 2:
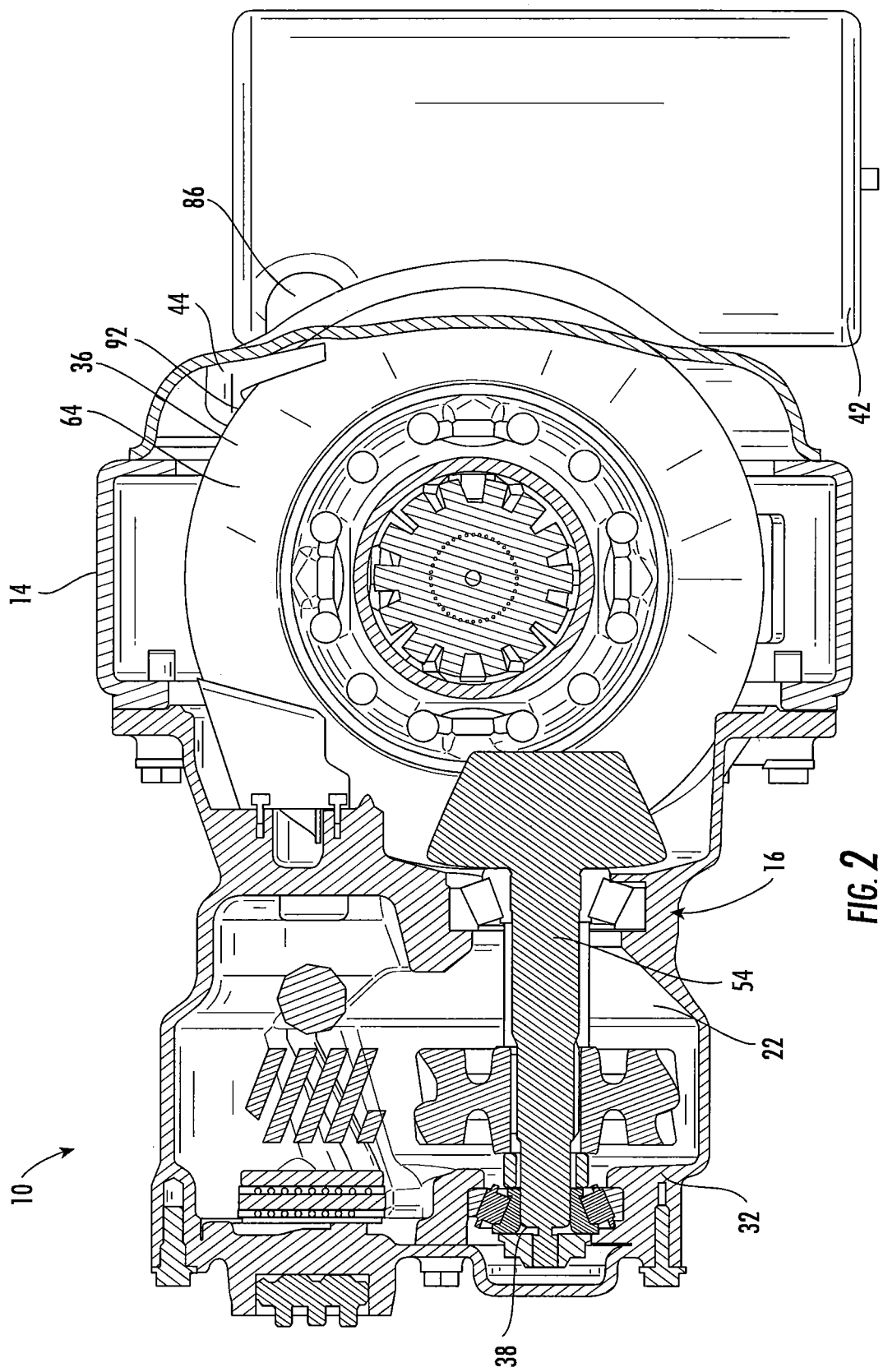
FIG. 2 illustrates a schematic sectional view of a portion of the axle assembly illustrated in FIG. 1.

As best shown in FIG. 2, a region of the cavity 30 may be located below the differential assembly 16 and may at least partially define a sump portion 32 that may contain lubrication fluid (not shown), such as oil. Splashed lubrication fluid may flow down the sides of the center portion 24 and may flow over internal components of the axle assembly 10 and gather in the sump portion 32. The lubrication fluid may lubricate components of the axle assembly 10, such as the differential assembly 16, a power distribution unit (PDU), and bearings.

As best shown in FIGS. 1 and 2 and as a non-limiting example, the differential assembly 16 may be disposed in the center portion 24 of the axle housing 14. A differential case 22 may surround the components of the differential assembly 16. The differential assembly 16 also includes a ring gear 36 interposed between the differential case 22 and a differential unit 38. The ring gear 36 may receive torque from another gear, such as a pinion gear 54, and transmit torque to the differential unit 38, which is configured to provide torque to the axle half shafts 18. The ring gear 36 may also be configured to splash lubrication fluid that accumulates at the sump portion 32 to various components of the differential assembly 16 that may require lubrication during operation.

Rotational energy is provided to the axle assembly 10 through an input shaft 40 that is rotated by a prime mover (not shown). The input shaft 40 may be coupled to a vehicle drivetrain component, such as a drive shaft. Alternatively, the input shaft 40 may be operatively connected to an output of another axle assembly. The input shaft 40 is disposed through the front housing cover 20A.

Figure 3:
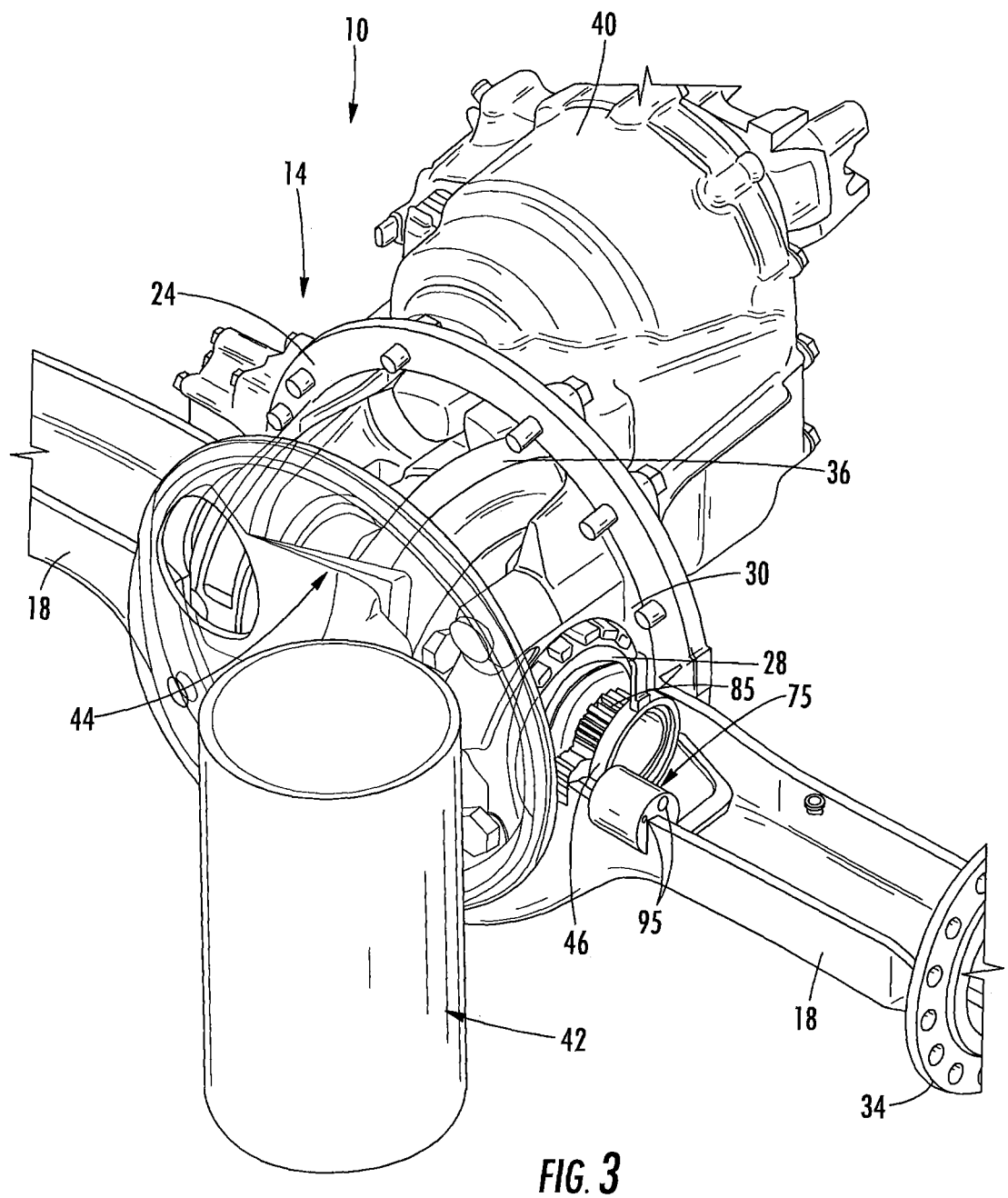
FIG. 3 illustrates a schematic partial sectional view of the pump mounted within a portion of the axle assembly illustrated in FIGS. 1 and 2.

As best shown in FIGS. 1-3, a storage receptacle, such as a fluid storage tank 42, is attached to a portion of the housing cover 20 and adjacent to the ring gear 36. In this embodiment, the fluid storage tank 42 is attached to a portion of the housing cover 20B disposed on the opposite side of the input shaft 40. In an embodiment, the fluid storage tank 42 has a cylindrical shape. One of ordinary skill in the art, though, would appreciate that the lubrication fluid tank 42 may also have other configurations that allow for fluid storage. The fluid storage tank 42 is configured to collect and store lubrication fluid and to return lubrication fluid to the sump portion 32.

FIGS. 2 and 3 show sectional views of the fluid storage tank 42 attached to the center portion 24 of the axle housing 14. In this embodiment, a lubrication directing assembly 44 is integrated within the axle housing 14 and is disposed against the ring gear 36. One of ordinary skill in the art would appreciate that the fluid storage tank 42 may also be attached to other portions of the axle housing 14, besides the center portion 24.

In another embodiment, the lubrication directing assembly 44 is disposed directly adjacent to the ring gear 36 within the axle housing 14. The lubrication directing assembly 44 is configured to take lubrication fluid from various rotating components in the axle housing 14, such as the ring gear 36, and to direct it into the fluid storage tank 42.

In some embodiments, the fluid storage tank 42 may include one or more valves disposed therein. The valves may aid in the amount of lubrication fluid that is stored in and guided from the fluid storage tank 42. The fluid storage tank 42 may also include a port disposed on a top surface thereof. The port may aid in pumping lubrication fluid to certain components in the axle housing 14. The port may also provide a connection point for tube or lubrication fluid lines to route lubrication fluid directly to desire components in the axle assembly 10. Lubrication fluid may be continuously removed from the sump portion 32 and the ring gear 36 to lower the lubrication fluid volume and to fill the fluid storage tank 42. Some of the benefits achieved from reducing the presence of lubrication fluid are improved vehicle efficiency, while maintaining proper temperature and lubricant life in the vehicle.

Figure 4:
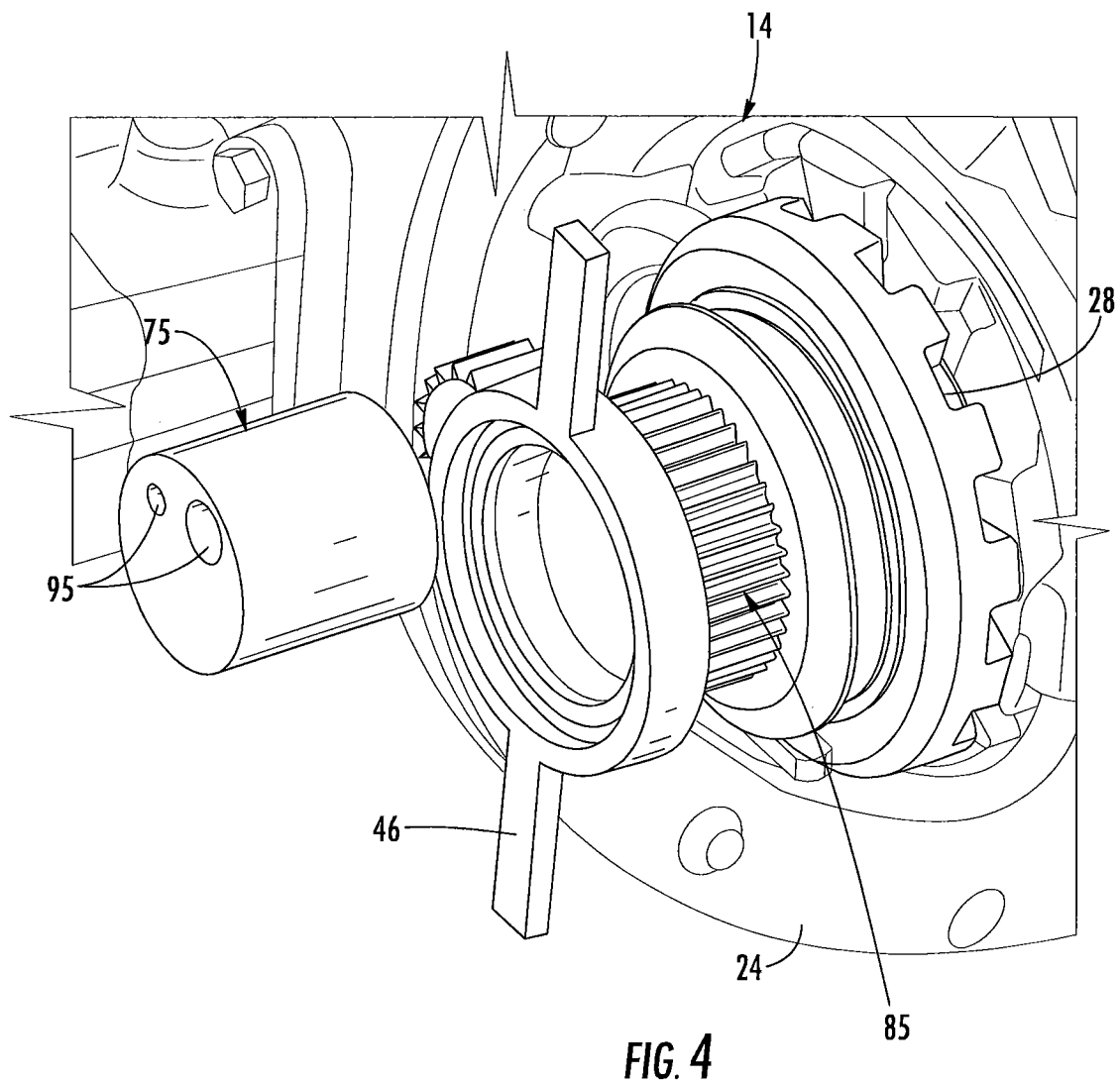
FIG. 4 illustrates a schematic sectional view of the axle housing illustrated in FIGS. 1-3.

FIGS. 1, 3, and 4 show views of the axle assembly 10 having a pump 75. In the embodiment shown in FIGS. 1, 3, and 4, the pump 75 is mounted to at least a portion of the one or more axle shaft housings 18 in the axle housing 14. In some embodiments, the pump 75 may be any type of lubrication fluid pump, such as a gerotor pump, a gear pump, a crescent pump, a vane pump, or the like. The pump 75 may include a piston (not shown) that is configured to move between an extended position and a retracted position. In alternative embodiments, the pump 75 may be connected to the one or more axle shaft housings 18 though other techniques, such as welding, bonding, mechanical fasteners, and/or a combination thereof.

The pump 75 may have one or more tangs 95, wherein the one or more tangs 95 are positioned in the axle shaft housings 18. In the embodiment shown in FIGS. 3 and 4, two tangs 95 are positioned in the axle shaft housings 18. The tangs 95 are configured to mount the pump 75 inside the axle housing 14.

As best shown in FIGS. 3 and 4, the pump 75 may be mounted to the one or more axle shaft housings 18 with a pump gear 85. Non-limiting examples of the pump gear 85 may be a helical gear, a spur gear, a belt-driven gear, a chain-driven gear, or any gear that is able to reduce noise. In an embodiment, the pump gear 85 is connected to a portion of the one of the axle half shafts 28 by using one or more mechanical fasteners, one or more welds, one or more adhesives, a spline connection and/or a threaded connection.

As best shown in FIGS. 3 and 4 and as a non-limiting example, the pump gear 85 is mounted and positioned within the axle housing 14 using a bracket 46. The bracket 46 may circumferentially encompass the pump gear 85 to aid in the alignment and installation of the pump gear 85 to one or more of the axle half shafts 28. One of ordinary skill in the art would appreciate that the bracket 46 may have various sizes and configurations.

As a vehicle travels and varies with speed, the pump gear 85, via the one or more axle half shafts 28, may passively drive the pump 75 and supply lubrication fluid to various rotating/moving components of the axle assembly 10, such as bearings. Lubrication fluid may be pumped to these components from the fluid storage tank 42 at a rate based on the speed of the vehicle having the axle assembly 10. This results in a reduction of the presence of lubrication fluid at the ring gear 36 to improve efficiency while maintaining an appropriate lubrication fluid volume to maintain proper temperature and lubrication fluid life.

Figure 5:
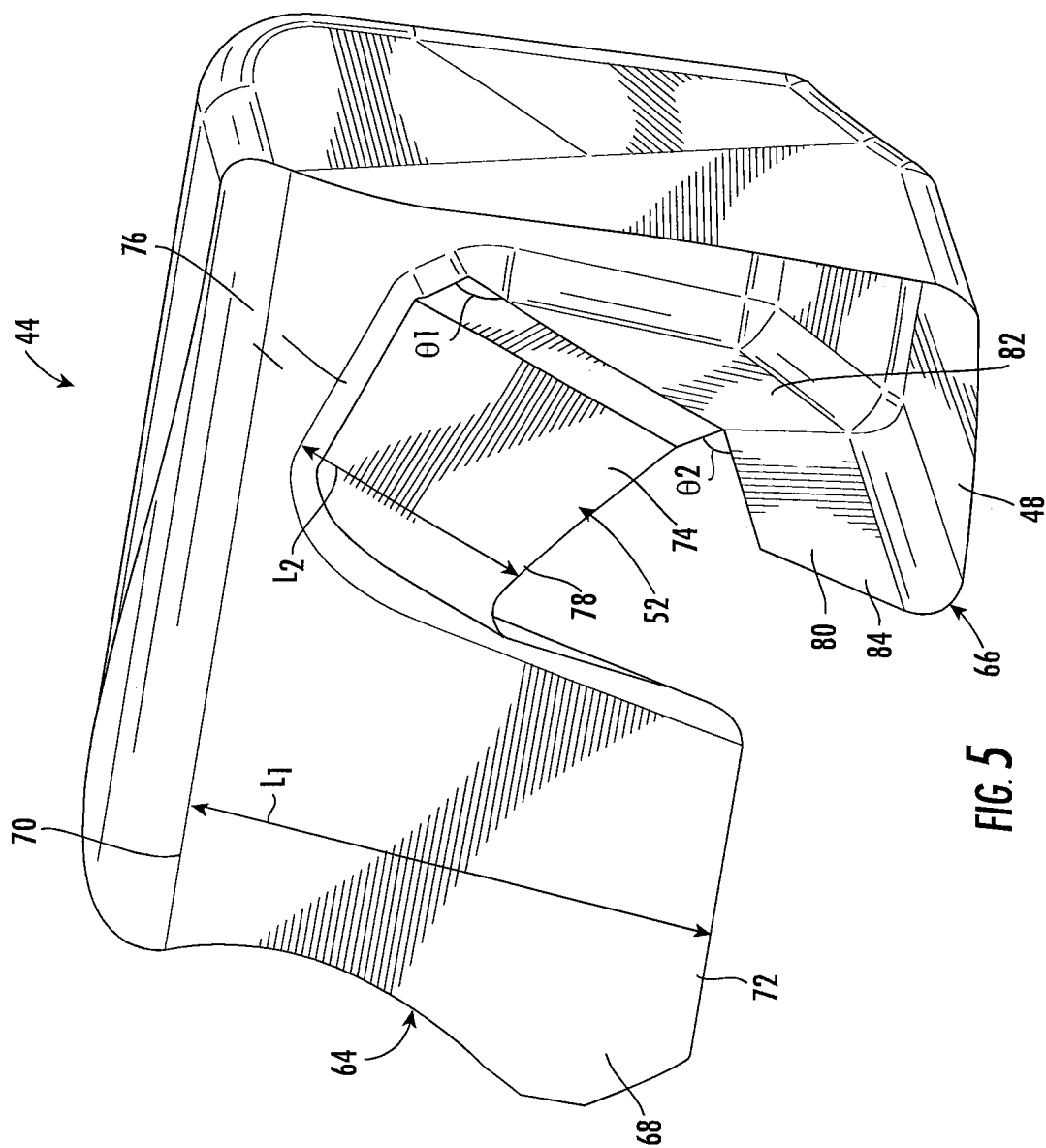
FIG. 5 illustrates a schematic perspective view of a lubrication directing assembly illustrated in FIGS. 1-3.

As best shown in FIGS. 2 and 5 and as a non-limiting example, the lubrication directing assembly 44 includes a first portion 64 in contact with a front side 50 of the ring gear 36, an opposing third portion 66 in contact with a back side 26 of the ring gear 36, and a second portion 52 interposed between the first portion 64 and the third portion 66. In some embodiments, the first portion 64 is directly proximate to the front side 50 of the ring gear 36 and the third portion 66 is directly proximate to the back side 26 of the ring gear 36.

The first portion 64 includes a first lubrication flow surface 68, wherein the first lubrication flow surface 68 is substantially flat. The first portion 64 also includes a top end 70 and a bottom end 72, and a length L1 extending from the top end 70 to the bottom end 72. The first lubrication flow surface 68 may aid in collecting lubrication fluid from the ring gear 36 and directing it to the second portion 52.

As best shown in FIG. 5, the second portion 52 may have a reduced diameter with respect to each of the first portion 64 and the third portion 66. The second portion 52 includes a second lubrication flow surface 74, wherein the second lubrication flow surface 74 may be substantially concave. The second portion 52 also includes a top end 76 and a bottom end 78, and a length L2 extending from the top end 76 and the bottom end 78. In an embodiment, L1 is approximately two times greater than L2. As a result, the second portion 52 may be directly proximate to or in contact with an outer surface 92 of the ring gear 36 such that the second portion 52 is straddling, but not directly attached to, the ring gear 36. The lubrication directing assembly 44 may then readily wipe lubrication fluid from the front side 50 and the outer surface 92 of the ring gear 36 and direct the lubrication fluid to the third portion 66.

As best shown in FIG. 5, the third portion 66 includes a third lubrication flow surface 80, wherein the third lubrication flow surface 80 defines a trough 48 extending away from the ring gear 36. The trough 48 includes a first segment 82 extending at a first angle θ1 and a second segment 84 extending at a second angle θ2 with respect to the first portion 64, wherein the first angle θ1 is different than the second angle θ2. As a non-limiting example, the first angle θ1 may be approximately between about 120 and 180 degrees and the second angle θ2 may be approximately between about 90 and 120 degrees. The trough 48 is configured to collect lubrication fluid and direct it away from the axle housing 14 and to the fluid storage tank 42. One of ordinary skill in the art would understand that other configurations are possible for the trough 48.

In some embodiments, the lubrication directing assembly 44 may be made of high strength, low alloy, sheet metal steel, although other materials could be used if desired, for example, other metallic materials, such as aluminum, or high temperature polymeric materials.

In some embodiments, after lubrication fluid is removed from the ring gear 36, the lubrication fluid may flow up the first lubrication flow surface 68, into the second lubrication flow surface 74, into the trough 48, and into the fluid storage tank 42.

Figure 6:
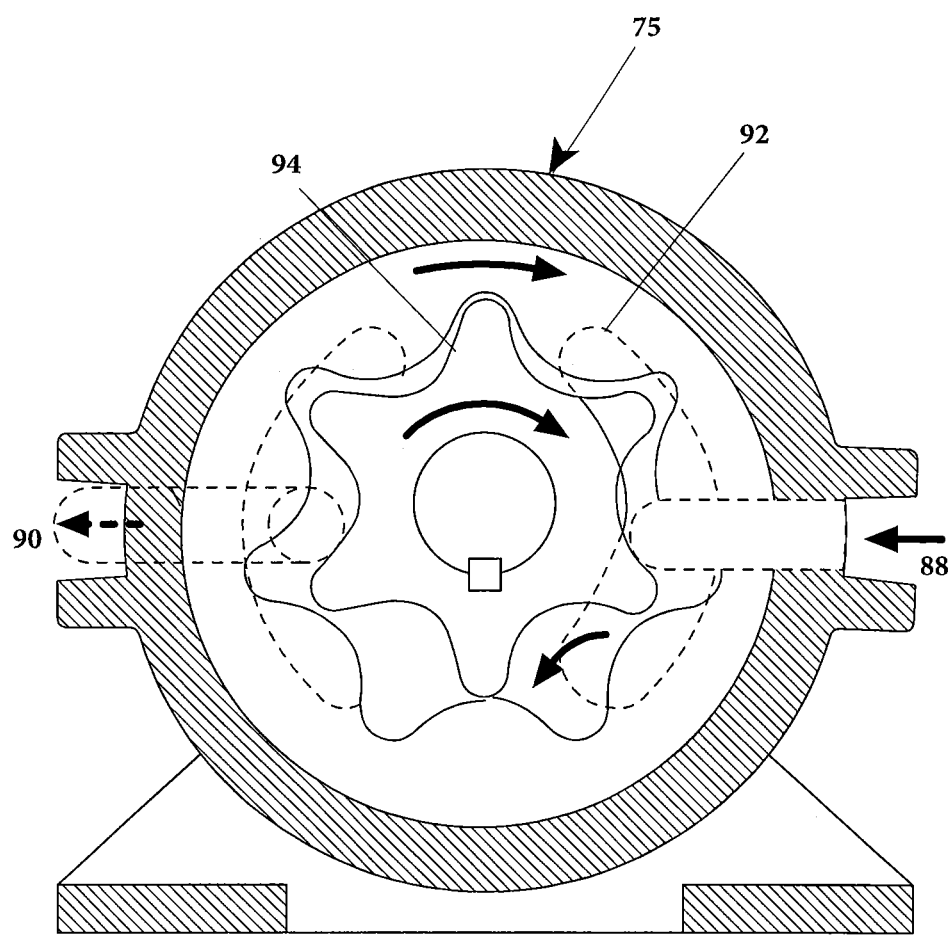
FIG. 6 illustrates a schematic sectional view of the pump illustrated in FIGS. 1, 3, and 4.

FIG. 6 shows a schematic sectional view of the pump 75. The embodiment of the pump 75 shown in FIG. 6 includes an inlet 88, an outlet 90, an internal gear 92, a gerotor element 94, and a pump valve 86. The pump valve 86 may be directly attached to either the inlet 88 or the outlet 90 of the pump 75. Lubrication fluid may flow into the inlet 88, through the gerotor element 94, and out of the outlet 90.

In an embodiment, the pump valve 86 is a one-way check valve. The pump valve 86 is configured to only permit lubrication fluid to flow in one direction. As a result, the pump valve 86 may limit and/or prevent any back flow of lubrication fluid when the pump 75 and the vehicle are stopped. This ensures that lubrication fluid is readily available during vehicle startup without requiring priming.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. An axle assembly comprising:
   an axle housing having a center portion defining a sump and one or more axle shaft housings extending from the center portion, wherein each of the axle shaft housings receives an axle half shaft, and wherein the axle housing comprises:
   a differential assembly having a ring gear; and
   a lubrication directing assembly disposed directly adjacent to the ring gear;
   a pump mounted in one or more of the axle shaft housings and drivingly coupled to a pump gear, wherein the pump gear is drivingly coupled to the axle half shaft;
   an axle housing cover surrounding the axle housing; and
   a fluid storage tank attached to the housing cover, wherein the fluid storage tank comprises a fill channel directly attached to the housing cover.

2. The axle assembly of claim 1, wherein the pump includes one or more tangs and wherein the pump is mounted in one or more of the axle shaft housings using the one or more tangs.

3. The axle assembly of claim 1, wherein the pump is a gerotor pump.

4. The axle assembly of claim 1, wherein the pump gear is a helical gear.

5. The axle assembly of claim 4, wherein the pump gear is splined to the axle half shaft.

6. The axle assembly of claim 1, wherein the axle half shaft passively drives the pump and the pump controls the rate of lubrication flow from the fluid storage tank.

7. The axle assembly of claim 1, wherein the pump includes a one-way check valve.

8. The axle assembly of claim 1, wherein the pump gear is mounted and positioned in the axle housing using a bracket.

9. The axle assembly of claim 1, wherein the lubrication directing assembly comprises a first portion having a first lubrication flow surface, a second portion having a second lubrication flow surface, and a third portion having a trough, wherein the second portion is interposed between the first portion and the trough.

10. The axle assembly of claim 9, wherein the trough is connected to the fill channel.

11. The axle assembly of claim 9, wherein the second lubrication flow surface has a reduced diameter as compared with the diameters of the first lubrication flow surface and the third lubrication flow surface.

12. The axle assembly of claim 7, wherein the valve is attached to either an inlet or an outlet of the pump.

* * * * *